United States Patent
Chen et al.

(10) Patent No.: US 12,539,492 B2
(45) Date of Patent: Feb. 3, 2026

(54) EXHAUST GAS TREATMENT AND MONITORING SYSTEM FOR A MEDICAL WASTE DISPOSAL EQUIPMENT

(71) Applicant: ZHEJIANG WEIDUN ENVIRONMENTAL TECHNOLOGY CO., LTD., Hangzhou (CN)

(72) Inventors: Weixing Chen, Hangzhou (CN); Yiming Chen, Hangzhou (CN); Guanzhong Huang, Hangzhou (CN)

(73) Assignee: ZHEJIANG WEIDUN ENVIRONMENTAL TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 19/172,414

(22) Filed: Apr. 7, 2025

(65) Prior Publication Data
US 2025/0312734 A1  Oct. 9, 2025

(30) Foreign Application Priority Data
Apr. 7, 2024  (CN) .......................... 202410406986.6

(51) Int. Cl.
*B01D 53/34* (2006.01)
*B01D 53/74* (2006.01)

(52) U.S. Cl.
CPC ........... *B01D 53/346* (2013.01); *B01D 53/74* (2013.01); *B01D 2257/304* (2013.01);
(Continued)

(58) Field of Classification Search
CPC ...... B01D 53/00; B01D 53/34; B01D 53/346; B01D 53/74; B01D 2257/00;
(Continued)

(56) References Cited

U.S. PATENT DOCUMENTS

| 10,888,818 B2 * | 1/2021 | De Ren | B01D 53/76 |
| 2013/0287697 A1 * | 10/2013 | Lin | A61P 35/00 |
| | | | 424/9.4 |

(Continued)

FOREIGN PATENT DOCUMENTS

| CN | 116688754 A | 9/2023 |
| CN | 117018850 A | 11/2023 |

OTHER PUBLICATIONS

CN 109472468 A, with machine translation (Year: 2019).*
(Continued)

*Primary Examiner* — Natasha E Young
(74) *Attorney, Agent, or Firm* — Westbridge IP LLC

(57) ABSTRACT

An exhaust gas treatment and monitoring system for a medical waste disposal equipment includes: an exhaust gas treatment device configured to receive and treat exhaust gas generated by the medical waste disposal equipment; a monitoring device configured to monitor VOCs, particulate matter, and odorous pollutants in the exhaust gas in real-time and generate corresponding monitoring data; and a control device. The control device includes: a data receiving module, which is used for receiving the monitoring data; an analysis and processing module configured to analyze and process the received monitoring data; an optimization module configured to generate optimization solutions based on analysis results of the monitoring data; and a control module configured to control the operating parameters of the exhaust gas treatment device based on the generated optimization solution.

4 Claims, 1 Drawing Sheet

(52) U.S. Cl.
CPC .... *B01D 2257/306* (2013.01); *B01D 2257/40* (2013.01); *B01D 2257/406* (2013.01); *B01D 2257/708* (2013.01); *B01D 2257/90* (2013.01); *B01D 2258/02* (2013.01)

(58) Field of Classification Search
CPC .......... B01D 2257/30; B01D 2257/304; B01D 2257/306; B01D 2257/40; B01D 2257/406; B01D 2257/70; B01D 2257/708; B01D 2257/90; B01D 2258/00; B01D 2258/02
See application file for complete search history.

(56) References Cited

U.S. PATENT DOCUMENTS

| | | | |
|---|---|---|---|
| 2020/0184131 A1* | 6/2020 | Zhang | G06N 20/20 |
| 2023/0259075 A1* | 8/2023 | Han | G05B 13/0265 700/29 |

OTHER PUBLICATIONS

CN 103942599 A with machine translation (Year: 2014).*
CN 117138541 B with machine translation (Year: 2024).*
First Office Action issued in counterpart Chinese Patent Application No. 202410406986.6, dated May 11, 2024.

* cited by examiner

EXHAUST GAS TREATMENT AND MONITORING SYSTEM FOR A MEDICAL WASTE DISPOSAL EQUIPMENT

CROSS-REFERENCE TO RELATED APPLICATIONS

The present application claims priority to Chinese Patent Application No. 202410406986.6, filed on Apr. 7, 2024, the content of which is incorporated herein by reference in its entirety.

TECHNICAL FIELD

The present application relates to the technical field of medical waste disposal, specifically relates to an exhaust gas treatment and monitoring system for a medical waste disposal equipment.

BACKGROUND

In the field of medical waste disposal, exhaust gas treatment is a crucial step. As medical waste may contain various harmful substances, if it is directly released into the atmosphere without proper disposal, it can pose a serious threat to the environment and human health. Therefore, before the exhaust gas is released into the atmosphere, effective treatment must be carried out to ensure that it meets the relevant emission standards.

However, in existing medical waste disposal technologies, the exhaust gas treatment process often lacks a real-time monitoring system. This means that during the treatment process, when equipment malfunctions or the exhaust gas purification device requires maintenance, it is not possible to promptly and accurately know the actual situation of exhaust gas emissions. In such cases, there is a potential risk of harmful substances in the exhaust gas exceeding the standard, which could pose a potential hazard to the environment.

In addition, even if the emissions after exhaust gas treatment meet the standards, there may still be odorous substances present. Although these odorous substances are non-toxic, their presence can have a negative impact on the surrounding environment and the life quality of residents. Therefore, during the exhaust gas treatment process, in addition to ensuring that harmful substances meet emission standards, effective control of odorous substances is also necessary.

In view of this, there is a need for an exhaust gas treatment and monitoring system for a medical waste disposal equipment to solve the aforementioned problems.

SUMMARY

In order to solve the above technical problems, that is, to solve the problems of the lack of real-time monitoring and insufficient odor control in the exhaust gas treatment process in existing medical waste disposal technologies.

The application provides an exhaust gas treatment and monitoring system for a medical waste disposal equipment, wherein the exhaust gas treatment and monitoring system comprises:

An exhaust gas treatment device configured to receive and treat the exhaust gas generated by the medical waste disposal equipment;

A monitoring device configured to monitor the emissions in the exhaust gas in real-time and generating corresponding monitoring data; and A control device configured to receive the monitoring data, performing analysis and processing, generating optimization solutions based on the analysis results, and controlling the operating parameters of the exhaust gas treatment device.

Preferably, the control device includes:

a data receiving module configured to receive the monitoring data;

an analysis processing module configured to analyze and process the received monitoring data;

an optimization module configured to generate an optimization solution based on the analysis results of the monitoring data; and a control module configured to control the operating parameters of the exhaust gas treatment device based on the generated optimization solution.

Preferably, the emissions include VOCs, particulate matter, and odorous pollutants. The optimization solution generated based on the analysis results of the monitoring data includes:

defining the minimization of the emission concentrations of VOCs, particulate matter, and odorous pollutants as the optimization objective;

determining the chemical reagent dosage, reaction temperature, and reaction time of the exhaust gas treatment device as decision variables;

constructing the objective function of the optimization goal;

determining the constraint conditions;

using a multi-objective particle swarm optimization to compute the objective function, resulting in the optimal parameter combination.

Preferably, the objective function is:

$$J(x) = \omega_1 \cdot C_{VOCs}(x_1, x_2, x_3) + \omega_2 \cdot C_{particulate\ matter}(x_1, x_2, x_3) + \omega_3 \cdot C_{odor}(x_1, x_2, x_3); \quad (1)$$

Wherein, J (x) is the objective function of the optimization goal, $C_{VOCs}(x_1, x_2, x_3)$ is the function of the VOCs concentration, $C_{particulate\ matter}(x_1, x_2, x_3)$ is the function of the particulate matter concentration, $C_{odor}(x_1, x_2, x_3)$ is the function of the odorous pollutants concentration, $x_1$ is the chemical reagent dosage, $x_2$ is the reaction temperature, $x_3$ is the reaction time, $\omega_1$, $\omega_2$ and $\omega_3$ is the weight coefficients;

Determining the constraint conditions;

$$\begin{cases} x_{1\_min} \leq x_1 \leq x_{1\_max} \\ x_{2\_min} \leq x_2 \leq x_{2\_max} \\ x_{3\_min} \leq x_3 \leq x_{3\_max} \\ VOCs(x_1, x_2, x_3) \leq C_{VOCs\_standard} \\ C_{particulate\ matter}(x_1, x_2, x_3) \leq C_{particulate\ matter\_standard} \end{cases} \quad (2)$$

$$C_{odor}(x_1, x_2, x_3) \leq C_{\_odor\_standard}$$

Wherein, $x_{1\_min}$ is the minimum value of the chemical reagent dosage, $x_1$ max is the maximum value of the chemical reagent dosage; $x_{2\_min}$ is the minimum value of the reaction temperature, $x_2$ max is the maximum value of the reaction temperature; $x_{3\_min}$ is the minimum value of the reaction time, $x_3$ max is the maximum value of the reaction time; $C_{VOCs\_standard}$ is the VOCs emission standard limit, $C_{particulate\ matter\_standard}$ is the particulate matter emission standard limit, $C_{odor\_standard}$ is the odorous pollutants emission standard limit.

Preferably, the formula for $C_{VOCs}(x_1, x_2, x_3)$ is:

$$C_{VOCs}(x_1, x_2, x_3) = \frac{a}{x_1} \cdot e^{-b \cdot x_2} \cdot \log(c \cdot x_3); \quad (3)$$

Wherein, a, b and c are all coefficients.

Preferably, the formula for $C_{particulate\ matter}(x_1, x_2, x_3)$ is:

$$C_{particulate\ matter}(x_1, x_2, x_3) = \frac{d_0}{x_1} \cdot (1 + d_1 \cdot e^{-d_2 \cdot x_2} - d_3 \cdot \log(x_3)); \quad (4)$$

Wherein, $d_0$, $d_1$, $d_2$ and $d_3$ are all coefficients.

Preferably, the formula for $C_{odor}(x_1, x_2, x_3)$ is:

$$C_{odor}(x_1, x_2, x_3) = \frac{e_0}{x_1} \cdot (1 + e_1 \cdot e^{-e_2 \cdot x_2} - e_3 \cdot x_3); \quad (5)$$

Wherein, $e_0$, $e_1$, $e_2$ and $e_3$ are all coefficients.

Preferably, the multi-objective particle swarm optimization is used for computing the objective function, resulting in the optimal parameter combination, which includes:
  initializing the particle swarm: set the parameters, randomly initialize the particles, and initialize the personal best and global best, wherein the dimension of the particles in the set parameters corresponds to the number of chemical reagent dosage, reaction temperature, and reaction time of the exhaust gas treatment device;
  evaluating particle fitness: calculate the fitness of each particle and update the personal best and global best;
  updating particle velocity and position: update the velocity of each particle and calculate the new position of the particle based on the updated velocity;
  checking termination conditions: check whether the termination conditions are met. If the termination conditions are met, proceed to the next step; if the termination conditions are not met, return to the step of evaluating particle fitness and continue the iteration;
  outputting the optimal parameter combination: output the position and fitness information of the global best.

Preferably, the termination conditions include the preset maximum number of iterations is reached, the solution quality satisfies the preset threshold, or the solution has converged.

Preferably, VOCs include one or more of the VOCs from the exhaust gas emission outlets and one or more of the VOCs from fugitive emissions; and/or, Particulate matter includes one or more of the particulate matters from the exhaust gas emission outlets and one or more of the particulate matter from fugitive emissions; and/or, Odorous pollutants include one or more of ammonia, trimethylamine, hydrogen sulfide, methyl mercaptan, dimethyl sulfide, dimethyldisulfide, carbon disulfide, and styrene.

As can be seen from the above, the exhaust gas treatment and monitoring system for a medical waste disposal equipment provided by the application has the following beneficial technical effects.

Firstly, improved exhaust gas treatment efficiency: by receiving and treating the exhaust gas generated by the medical waste disposal equipment through the exhaust gas treatment device, the system can effectively reduce the content of harmful substances in the exhaust gas, thereby ensuring that the exhaust gas emissions meet environmental protection standards.

Secondly, real-time monitoring and data feedback: the monitoring device can real-time monitor the emissions in the exhaust gas and generate corresponding monitoring data. This real-time monitoring mechanism can promptly detect any abnormalities in the exhaust gas treatment process, providing accurate data support to the operators and facilitating timely adjustments to the treatment strategy.

Thirdly, optimized exhaust gas treatment plan: after receiving the monitoring data, the control device analyzes and processes it, and generates an optimization plan based on the analysis results. This intelligent control approach allows the operating parameters of the exhaust gas treatment device to be dynamically adjusted according to the actual situation of exhaust gas emissions, achieving more efficient and precise exhaust gas treatment.

Fourthly, improved safety and environmental protection: through real-time monitoring and intelligent control, the system ensures the safety and environmental protection of exhaust gas emissions during the medical waste disposal process. This helps reduce the risks posed by medical waste disposal to the environment and human health, promoting the sustainable development of medical waste disposal.

Fifthly, reduced operating costs: the system optimizes the exhaust gas treatment plan, improving the operational efficiency of the equipment and reducing unnecessary energy consumption and material usage, thereby lowering the operating costs of medical waste disposal. At the same time, the real-time monitoring and early warning mechanism can reduce equipment failures and maintenance costs, improving the overall economic efficiency of the equipment.

BRIEF DESCRIPTION OF THE DRAWINGS

A better understanding of the features and advantages of the application can be gained by referring to the drawings, which are illustrative and should not be construed as any limitation on the application. In the drawings.

DETAILED DESCRIPTION OF THE EMBODIMENTS

To make the objectives, technical solutions, and advantages of the embodiments of the application clearer, the following clear and complete description will be provided in conjunction with the drawings of the embodiments of the application. It is evident that the described embodiments are part of the embodiments of the application, not all embodiments. Based on the embodiments of the application, all other embodiments that may be derived by those skilled in the art without any inventive effort are within the scope of protection of the application.

Based on the problems identified in the background technology of existing medical waste disposal technologies, such as the lack of real-time monitoring and inadequate odor control in the exhaust gas treatment process, the application provides an exhaust gas treatment and monitoring system for a medical waste disposal equipment. The system aims to improve exhaust gas treatment efficiency, enable real-time monitoring and data feedback, optimize the exhaust gas treatment plan, enhance safety and environmental protection, and reduce operating costs, making it widely applicable in the field of medical waste disposal.

Figure 1:
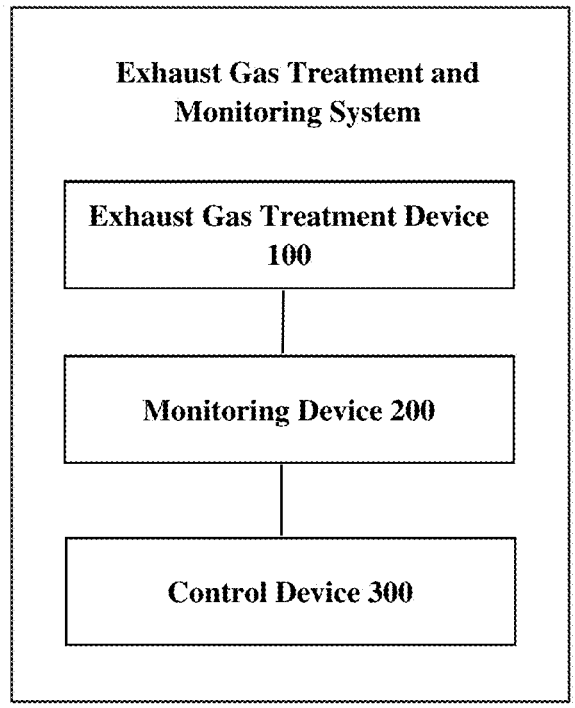
FIG. 1 is a structural schematic diagram of the exhaust gas treatment and monitoring system for a medical waste disposal equipment of the application.

As shown in FIG. 1, the exhaust gas treatment and monitoring system of the application includes:
- an exhaust gas treatment device 100 configured to receive and treat the exhaust gas generated by the medical waste disposal equipment;
- a monitoring device 200 configured to monitor the emissions in the exhaust gas in real time and generating corresponding monitoring data, wherein the emissions may include VOCs (Volatile Organic Compounds), particulate matter, and odor pollutants; and
- a control device 300 configured to receive the monitor data, analyzing and processing it, and generating an optimization plan based on the analysis results to control the operating parameters of the exhaust gas treatment device.

In the above, VOCs include one or more of the VOCs from the exhaust gas emission outlets and one or more of the VOCs from fugitive emissions; and/or, particulate matter includes one or more of the particulate matters from the exhaust gas emission outlets and one or more of the particulate matters from fugitive emissions; and/or, odor pollutants include one or more of ammonia, trimethylamine, hydrogen sulfide, methyl mercaptan, dimethyl sulfide, dimethyldisulfide, carbon disulfide, and styrene. Wherein fugitive emissions refer to the irregular release of air pollutants that do not pass through the exhaust outlets, typically occurring during production when leakage happens due to the lack of sealed equipment or inadequate sealing measures.

Figure 2:
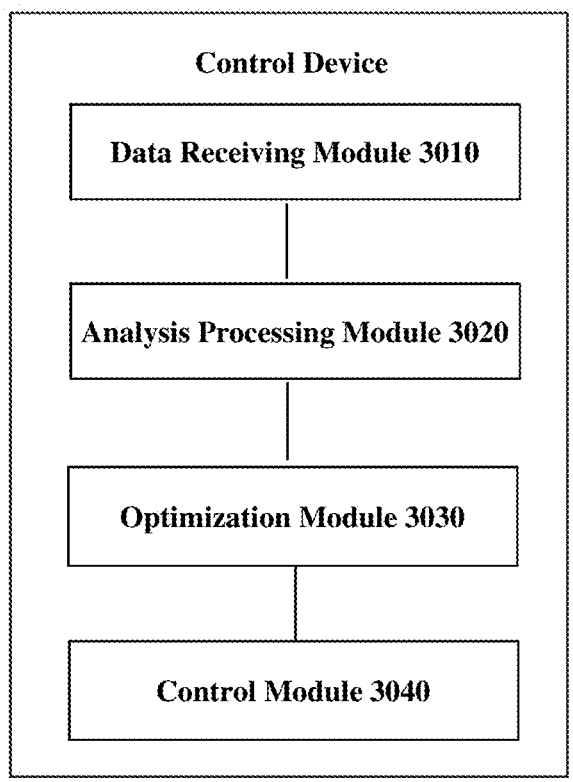
FIG. 2 is a structural schematic diagram of the control device of the exhaust gas treatment and monitoring system for a medical waste disposal equipment of the application.

Preferably, as shown in FIG. 2, the above control device 300 includes:
- a data reception module 3010 configured to receive the monitoring data;
- an analysis processing module 3020 configured to analyze and process the received monitoring data;
- an optimization module 3030 configured to generate an optimization solution based on the analysis results of the monitoring data; and
- a control module 3040 configured to control the operating parameters of the exhaust gas treatment device based on the generated optimization solution.

In the above, the optimization module 3030 can generate an optimization solution based on the analysis results of the monitoring data, which includes:

S10: minimizing the emission concentrations of VOCs, particulate matter, and odor pollutants as the optimization objective.

S20: determining the chemical reagent dosage, reaction temperature, and reaction time of the exhaust gas treatment device as decision variables.

S30: constructing the objective function for the optimization goal.

In a preferred scenario, the objective function is:

$$J_{(X)} = \omega_1 \cdot C_{VOCs}(x_1, x_2, x_3) + \omega_2 \cdot C_{particulate\,matter}(x_1, x_2, x_3) + \omega_3 \cdot C_{odor}(x_1, x_2, x_3); \quad (1)$$

Wherein, $J_{(x)}$ is the objective function for the optimization goal, which represents the weighted sum of the overall pollutant concentration, which is the quantity to be minimized during the optimization process.

$C_{VOCs}(x_1, x_2, x_3)$ is VOCs concentration function, $C_{Particulate\,matter}(x_1, x_2, x_3)$ is particulate matter concentration function, $C_{odor}(x_1, x_2, x_3)$ is odor pollutant concentration function, $x_1$ is chemical reagent dosage, $x_2$ is reaction temperature, $x_3$ is reaction time, $\omega_1$, $\omega_2$ and $\omega_3$ are weight coefficients, these weight coefficients can be set according to the actual application scenario and goals, and they must satisfy being positive numbers, i.e. $\omega_1 > 0$, $\omega_2 > 0$, $\omega_3 > 0$, and $\omega_1 + \omega_2 + w_3 = 1$.

In the above, the formula for $C_{VOCs}(x_1, x_2, x_3)$ is:

$$C_{VOCs}(x_1, x_2, x_3) = \frac{a}{x_1} \cdot e^{-b \cdot x_2} \cdot \log(c \cdot x_3); \quad (3)$$

Wherein a, b and c are all coefficients, which can be obtained by fitting experimental data. The $x_1$ increasing the chemical reagent dosage can reduce the VOCs concentration; The $x_2$ increasing the reaction temperature can also reduce the VOCs concentration; And the $x_3$ extending the reaction time can also reduce the VOCs concentration.

The formula for $C_{particulate\,matter}(x_1, x_2, x_3)$ is:

$$C_{particulate\,matter}(x_1, x_2, x_3) = \frac{d_0}{x_1} \cdot \left(1 + d_1 \cdot e^{-d_2 \cdot x_2} - d_3 \cdot \log(x_3)\right); \quad (4)$$

Wherein $d_0$, $d_1$, $d_2$ and $d_3$ are all coefficients, which can be obtained by fitting experimental data. The $x_1$ increasing the chemical reagent dosage means that more odor precursors are captured or reacted; The $x_2$ increasing the reaction temperature promotes the decomposition of odor compounds, leading to an increased generation rate of certain compounds; And the $x_3$ extending the reaction time leads to more odor compounds being captured or reacted.

The formula for $C_{odor}(x_1, x_2, x_3)$ is:

$$C_{odor}(x_1, x_2, x_3) = \frac{e_0}{x_1} \cdot (1 + e_1 \cdot e^{-e_2 \cdot x_2} - e_3 \cdot x_3); \quad (5)$$

Wherein $e_0$, $e_1$, $e_2$ and $e_3$ are all coefficients, which can be obtained by fitting experimental data. The $x_1$ increasing the chemical reagent dosage means that more odor precursors are captured or reacted; The $x_2$ increasing the reaction temperature promotes the decomposition of odor compounds, leading to an increased generation rate of certain compounds; And $x_3$ extending the reaction time leads to more odor compounds being captured or reacted.

S40: determining the constraint conditions.

In a preferred scenario, the constraint conditions are:

$$\begin{cases} x_{1\_min} \leq x_1 \leq x_{1\_max} \\ x_{2\_min} \leq x_2 \leq x_{2\_max} \\ x_{3\_min} \leq x_3 \leq x_{3\_max} \\ C_{VOCs}(x_1, x_2, x_3) \leq C_{VOCs\_standard} \\ C_{particulate\,matter}(x_1, x_2, x_3) \leq C_{particulate\,matter\_standard} \\ C_{odor}(x_1, x_2, x_3) \leq C_{\_odor\_standard} \end{cases} \quad (2)$$

Wherein, $x_{1\_min}$ is the minimum value of the chemical reagent dosage, $x_{1\_max}$ is the maximum value of the chemical reagent dosage; $x_{2\_min}$ is the minimum value of the reaction temperature, $x_{2\_max}$ is the maximum value of the reaction temperature; $x_{3\_min}$ is the minimum value of the reaction time, $x_{3\_max}$ is the maximum value of the reaction time; $C_{VOCs\_standard}$ is the VOCs emission standard limit, $C_{particulate\ matter\_standard}$ is the particulate matter emission standard limit, $C_{odor}(x_1, x_2, x_3)$ is the odorous pollutants emission standard limit.

Specifically, the specific values of $C_{VOCs\_standard}$, $C_{particulate\ matter\_standard}$ and $C_{odor\_standard}$ can be determined according to the table below. Taking odor pollutants as an example, when the odor pollutant is one of those listed in the table, such as ammonia, the value of $C_{odor\_standard}$ is 1.5 mg/m$^3$. When multiple odor pollutants from the table are present, a weighted sum method can be used for calculating a comprehensive standard limit $C_{odor\_standard}$.

| Emissions | Specific emission items | | Emission standard limit | Unit |
|---|---|---|---|---|
| VOCs (As Total Non-Methane Hydrocarbons) | Exhaust emission outlet | Emission concentration | 20 | mg/m$^3$ |
| | Fugitive emission | Emission concentration | 4.0 | mg/m$^3$ |
| Particulate Matter | Exhaust emission outlet | Emission concentration | 120 | mg/m$^3$ |
| | Fugitive emission | Emission concentration | 1.0 | mg/m$^3$ |
| Odor Pollutants | Ammonia | Emission concentration | 1.5 | mg/m$^3$ |
| | Trimethylamine | Emission concentration | 0.08 | mg/m$^3$ |
| | Hydrogen sulfide | Emission concentration | 0.06 | mg/m$^3$ |
| | Methyl mercaptan | Emission concentration | 0.007 | mg/m$^3$ |
| | Dimethyl sulfide | Emission concentration | 0.07 | mg/m$^3$ |
| | Dimethyl disulfide | Emission concentration | 0.06 | mg/m$^3$ |
| | Carbon disulfide | Emission concentration | 3.0 | mg/m$^3$ |
| | Styrene | Emission concentration | 5.0 | mg/m$^3$ |

S50: the multi-objective particle swarm optimization is used for calculating the objective function and obtaining the optimal parameter combination. In the above, the effects of chemical reagent dosage $x_1$, reaction temperature $x_2$ and reaction time $x_3$ on VOCs concentration, particulate matter concentration and odor pollutant concentration are different. Through the multi-objective particle swarm optimization, the optimal parameter combination can be obtained, which is then used for controlling the operation of the exhaust gas treatment device.

Specifically, the multi-objective particle swarm optimization is used for calculating the objective function and obtaining the optimal parameter combination, including:

initializing the particle swarm: set the parameters, randomly initialize the particles, and initialize the personal best and global best. Wherein the dimension of the particles corresponds to the number of chemical reagent dosage, reaction temperatures and reaction time of the exhaust gas treatment device.

In the above, the set parameters include determining the particle swarm size (i.e., the number of particles), the dimensions of the particles (corresponding to the number of decision variables, i.e., chemical reagent dosage, reaction temperature and reaction time), the upper bound and lower bound of particle velocity and position, cognitive learning factor, social learning factor and the inertia weight. Random initialization of particles involves randomly initializing the position and velocity of each particle within the set search space. The position represents a possible combination of decision variables, while the velocity determines the direction and step size of the particle's movement within the search space. Initializing the personal best and global best involves setting each particle's initial position as its personal best, and selecting the particle with the best fitness from all particles as the global best, with the fitness function being the aforementioned objective function.

Evaluating the particle fitness: calculate the fitness of each particle and update the personal best and global best.

In the above, calculating the fitness of each particle includes using the objective function to calculate its fitness at the current position, by substituting the particle's position (the values of the decision variables) into the simulated exhaust treatment model, thereby obtaining the corresponding emission concentrations of VOCs, particulate matter and odor pollutants.

If the current particle's fitness is better than its personal best (pbest) fitness, then update pbest to the current particle's position and fitness.

If the current particle's fitness is better than the global best (gbest) fitness, or if a new Pareto solution is found, then update gbest to the current particle's position and fitness. The Pareto Dominance is used for determining the superiority or inferiority of solutions.

Updating particle velocity and position: update the velocity of each particle and calculate the new position of the particle based on the updated velocity.

In the above, updating the velocity of each particle includes adjusting the velocity of each particle by combining the personal best (pbest) and the global best (gbest). The velocity update formula includes the current velocity, the influence of the personal best (pbest), the influence of the global best (gbest) and a disturbance. Updating the position involves using the updated velocity to calculate the new position of the particle. The new position represents a new combination of decision variables (i.e., chemical reagent dosage, reaction temperature and reaction time), but it needs to ensure that the new position is within the set search space. If the particle's new position or velocity exceeds the specified upper bound and lower bound, it needs to be adjusted back within the valid range.

Checking termination conditions: verify whether the termination conditions are met. If the termination conditions are met, proceed to the next step; if the termination conditions are not met, return to the step of evaluating particle fitness and continue the iteration.

In the above, preferably, the termination conditions include the preset maximum number of iterations is reached, the solution quality satisfies the preset threshold, or the solution has converged.

Outputting the optimal parameter combination: output the position and fitness information of the global best.

In the above, outputting of the global best's position represents the combination of chemical reagent dosage, reaction temperature and reaction time that minimizes the emission concentrations of VOCs, particulate matter and odor pollutants.

It should be noted that the specific embodiments of the application have been described above. Other embodiments fall within the scope of the claims. In some cases, the actions or steps described in the claims can be performed in a sequence different from that in the embodiments, yet still achieve the desired results. Additionally, the processes depicted in the drawings do not necessarily require the specific or continuous sequence shown to achieve the desired results. In certain implementations, multitasking and parallel processing are also possible or may be beneficial.

For convenience of description, the above device is described by dividing it into various modules based on their functions. Of course, when implementing the application, the functions of these modules can be realized in one or more software and/or hardware components.

It should also be noted that the terms "include", "comprise" or any other variations thereof are intended to cover non-exclusive inclusions, such that a process, method, article or device that includes a set of elements not only includes those elements but also includes other elements that are not explicitly listed, or elements that are inherent to such a process, method, article or device. Without further limitation, an element defined by the phrase "comprising a . . ." does not exclude the presence of additional identical elements in the process, method, article or device that includes the element.

Each embodiment of the application is described in a progressive manner, and similar or identical parts between the embodiments can be referenced accordingly. Each embodiment primarily highlights the differences from other embodiments. In particular, for system embodiments, since they are essentially similar to the method embodiments, the description is relatively simple, and the relevant parts can be referenced from the descriptions of the method embodiments.

A person of ordinary skill in the relevant field should understand that the discussions of the embodiments above are merely illustrative and are not intended to imply that the scope of the disclosure (including the claims) is limited to these examples. Under the concept of the present disclosure, the technical features from the above or different embodiments can be combined, and the steps can be performed in any order. And there are many other variations of different aspects of the one or more embodiments of the application as described above, which are not provided in detail for the sake of brevity.

Although specific embodiments of the disclosure have been described herein, many substitutions, modifications and variations of these embodiments will be obvious to those skilled in the art from the foregoing description.

The one or more embodiments of the application are intended to cover all such substitutions, modifications and variations that fall within the broad scope of the claims. Therefore, any omissions, modifications, equivalent substitutions, improvements, or the like made within the spirit and principles of the one or more embodiments of the application should be included within the protection scope of the disclosure.

What is claimed is:

1. An exhaust gas treatment and monitoring machine for a medical waste disposal equipment, wherein the exhaust gas treatment and monitoring machine comprises:
   an exhaust gas treatment device configured to receive and treat exhaust gas generated by the medical waste disposal equipment;
   a monitoring device configured to monitor VOCs, particulate matter, and odorous pollutants in the exhaust gas in real-time and generate corresponding monitoring data; and
   a control device comprising:
   a data receiving module, which is used for receiving the monitoring data;
   an analysis and processing module configured to analyze and process the received monitoring data;
   an optimization module configured to generate optimization solutions based on analysis results of the monitoring data; and
   a control module configured to control the operating parameters of the exhaust gas treatment device based on the generated optimization solution;
   wherein the generation of optimization solutions based on the analysis results of the monitoring data comprises:
   defining the minimization of the emission concentrations of VOCs, particulate matter, and odorous pollutants as the optimization objective;
   determining chemical reagent dosage, reaction temperature and reaction time of the exhaust gas treatment device as decision variables;
   constructing an objective function of the optimization goal, wherein the objective function is:

$$J_{(X)} = \omega_1 \cdot C_{VOCs}(x_1, x_2, x_3) + \omega_2 \cdot C_{particulate\ matter}(x_1, x_2, x_3) + \omega_3 \cdot C_{odor}(x_1, x_2, x_3) \quad (1)$$

wherein, $J_{(X)}$ is the objective function of the optimization goal, $C_{VOCs}(x_1, x_2, x_3)$ is the VOCs concentration function, $C_{particulate\ matter}(x_1, x_2, x_3)$ is the particulate matter concentration function, $C_{odor}(x_1, x_2, x_3)$ is the odorous pollutants concentration function, $x_1$ is the chemical reagent dosage, $x_2$ is the reaction temperature, $x_3$ is the reaction time, $\omega_1$, $\omega_2$ and $\omega_3$ are the weight coefficients;

determining constraint conditions, wherein the constraint conditions are:

$$\begin{cases} x_{1\_min} \leq x_1 \leq x_{1\_max} \\ x_{2\_min} \leq x_2 \leq x_{2\_max} \\ x_{3\_min} \leq x_3 \leq x_{3\_max} \\ C_{VOCs}(x_1, x_2, x_3) \leq C_{VOCs\_standard} \\ C_{particulate\ matter}(x_1, x_2, x_3) \leq C_{particulate\ matter\_standard} \\ C_{odor}(x_1, x_2, x_3) \leq C_{odor\_standard} \end{cases} \quad (2)$$

wherein, $x_{1\_min}$ is the minimum value of the chemical reagent dosage, $x_{1\_max}$ is the maximum value of the chemical reagent dosage; $x_{2\_min}$ is the minimum value of the reaction temperature, $x_{2\_max}$ is the maximum value of the reaction temperature; $x_{3\_min}$ is the minimum value of the reaction time, $x_{3\_max}$ is the maximum value of the reaction time; $C_{VOCs\_sandard}$ is the VOCs emission standard limit, $C_{particulate\ matter\_standard}$ is the particulate matter emission standard limit, $C_{odor\_standard}$ is the odorous pollutants emission standard limit;

the formula for $C_{VOCs}(x_1, x_2, x_3)$ is:

$$C_{VOCs}(x_1, x_2, x_3) = \frac{a}{x_1} \cdot e^{-b \cdot x_2} \cdot \log(c \cdot x_3) \quad (3)$$

wherein, a, b and c are all coefficients;

the formula for $C_{particulate\ matter}$ ($x_1$, $x_2$, $x_3$) is:

$$C_{particulate\ matter}(x_1, x_2, x_3) = \frac{d_0}{x_1} \cdot \left(1 + d_1 \cdot e^{-d_2 \cdot x_2} - d_3 \cdot \log(x_3)\right) \quad (4)$$

wherein, $d_0$, $d_1$, $d_2$ and $d_3$ are all coefficients;
the formula for $C_{odor}$ ($x_1$, $x_2$, $x_3$) is:

$$C_{odor}(x_1, x_2, x_3) = \frac{e_0}{x_1} \cdot (1 + e_1 \cdot e^{-e_2 \cdot x_2} - e_3 \cdot x_3) \quad (5)$$

wherein, $e_0$, $e_1$, $e_2$ and $e_3$ are all coefficients;
a multi-objective particle swarm optimization is used for computing the objective function, resulting in the optimal parameter combination, which is then used for controlling the operation of the exhaust gas treatment device.

2. The exhaust gas treatment and monitoring machine for a medical waste disposal equipment according to claim 1, wherein the multi-objective particle swarm optimization is used for computing the objective function, resulting in the optimal parameter combination, which comprises:
  initializing particle swarm: set the parameters, randomly initialize the particles, and initialize the personal best and global best, wherein the dimension of the particles in the set parameters corresponds to the number of chemical reagent dosage, reaction temperature, and reaction time of the exhaust gas treatment device;
  evaluating particle fitness: calculate the fitness of each particle and update the personal best and global best;
  updating particle velocity and position: update the velocity of each particle and calculate the new position of the particle based on the updated velocity;
  checking termination conditions: check whether the termination conditions are met, if the termination conditions are met, proceed to the next step; if the termination conditions are not met, return to the step of evaluating particle fitness and continue the iteration; and
  outputting the optimal parameter combination: output the position and fitness information of the global best.

3. The exhaust gas treatment and monitoring machine for a medical waste disposal equipment according to claim 2, wherein the termination conditions comprise a preset maximum number of iterations is reached, the solution quality satisfies the preset threshold, or the solution has converged.

4. The exhaust gas treatment and monitoring machine for a medical waste disposal equipment according to claim 1, wherein VOCs comprise one or more of the VOCs from the exhaust gas emission outlets and one or more of the VOCs from fugitive emissions; and/or,
  particulate matter comprises one or more of the particulate matters from the exhaust gas emission outlets and one or more of the particulate matter from fugitive emissions; and/or,
  odor pollutants comprise one or more of ammonia, trimethylamine, hydrogen sulfide, methyl mercaptan, dimethyl sulfide, dimethyldisulfide, carbon disulfide, and styrene.

* * * * *